United States Patent
Sumers (10) Patent No.: US 10,297,148 B2
(45) Date of Patent: May 21, 2019

(54) NETWORK COMPUTER SYSTEM FOR ANALYZING DRIVING ACTIONS OF DRIVERS ON ROAD SEGMENTS OF A GEOGRAPHIC REGION

(71) Applicant: Uber Technologies, Inc., San Francisco, CA (US)

(72) Inventor: Theodore Russell Sumers, San Francisco, CA (US)

(73) Assignee: UBER TECHNOLOGIES, INC., San Francisco, CA (US)

( * ) Notice: Subject to any disclaimer, the term of this patent is extended or adjusted under 35 U.S.C. 154(b) by 0 days.

(21) Appl. No.: 15/382,453

(22) Filed: Dec. 16, 2016

(65) Prior Publication Data

US 2017/0236411 A1 Aug. 17, 2017

Related U.S. Application Data (60) Provisional application No. 62/296,297, filed on Feb. 17, 2016.

(51) Int. Cl.
*G08G 1/01* (2006.01)
*B60W 40/09* (2012.01)
(Continued)

(52) U.S. Cl.
CPC .......... *G08G 1/0133* (2013.01); *B60W 40/06* (2013.01); *B60W 40/09* (2013.01); *B60W 40/10* (2013.01);
(Continued)

(58) Field of Classification Search
CPC .. G08G 1/0133; G08G 1/0112; G01C 21/165; G01C 21/3484; G01C 21/3492;
(Continued)

(56) References Cited

U.S. PATENT DOCUMENTS

| 6,195,648 | B1 | 2/2001 | Simon |
| 8,010,285 | B1 | 8/2011 | Denise |

(Continued)

FOREIGN PATENT DOCUMENTS

| JP | 2014-130552 | 6/2014 |
| KR | 10-2014-0124137 | 10/2014 |

(Continued)

OTHER PUBLICATIONS

International Search Report and Written Opinion in PCT/US2016/026799 dated Jul. 28, 2016.
(Continued)

*Primary Examiner* — Abby Y Lin
(74) *Attorney, Agent, or Firm* — Fenwick & West LLP (57) ABSTRACT

Examples include a network computer system and/or service which operates to remotely monitor vehicles to detect and characterize driving actions of drivers with respect to specific road segments of a roadway, enabling driving actions performed by multiple drivers at a specific road segment to be characterized and modeled. Models can inform municipalities about potential traffic hazards or other safety challenges. Individual drivers can also be measured against the model to help understand driver performance. Validating vehicle data against baseline values can also detect spoofing of that data.

21 Claims, 4 Drawing Sheets

(51) Int. Cl.
*H04W 4/02* (2018.01)
*G01C 21/16* (2006.01)
*B60W 40/10* (2012.01)
*G06F 3/01* (2006.01)
*B60W 40/06* (2012.01)
*G08G 1/052* (2006.01)

(52) U.S. Cl.
CPC ............ *G01C 21/165* (2013.01); *G06F 3/016* (2013.01); *G08G 1/0112* (2013.01); *G08G 1/0129* (2013.01); *H04W 4/027* (2013.01); *B60W 2520/105* (2013.01); *B60W 2520/125* (2013.01); *B60W 2550/12* (2013.01); *B60W 2550/14* (2013.01); *B60W 2550/402* (2013.01); *G08G 1/052* (2013.01)

(58) Field of Classification Search
CPC ..... H04W 4/027; H04W 4/046; B60W 40/09; G06Q 40/08
See application file for complete search history.

(56) References Cited

U.S. PATENT DOCUMENTS

| | | | |
|---|---|---|---|
| 8,417,448 B1 | 4/2013 | Denise | |
| 8,417,449 B1 | 4/2013 | Denise | |
| 8,538,158 B1 | 9/2013 | Denise | |
| 8,670,930 B1 | 3/2014 | Denise | |
| 8,718,926 B1 | 5/2014 | Denise | |
| 8,731,770 B2 | 5/2014 | Fischer | |
| 8,924,240 B2 | 12/2014 | Depura et al. | |
| 8,934,719 B1 | 1/2015 | Denise | |
| 9,097,545 B1 | 8/2015 | Denise | |
| 9,477,639 B2 | 10/2016 | Fischer et al. | |
| 9,628,958 B1* | 4/2017 | McBurney | H04W 4/027 |
| 2005/0049831 A1 | 3/2005 | Lilly | |
| 2006/0178807 A1 | 8/2006 | Kato et al. | |
| 2009/0182492 A1* | 7/2009 | Alten | G01C 21/3484 701/532 |
| 2011/0000747 A1 | 1/2011 | Wu | |
| 2013/0041941 A1* | 2/2013 | Tomasic | G08G 1/123 709/203 |
| 2014/0051465 A1 | 2/2014 | Ruys et al. | |
| 2014/0067434 A1 | 3/2014 | Bourne et al. | |
| 2014/0129951 A1 | 5/2014 | Amin et al. | |
| 2014/0358376 A1 | 12/2014 | Phelan | |
| 2015/0095235 A1 | 4/2015 | Dua | |
| 2015/0106900 A1 | 4/2015 | Pinski | |
| 2015/0113622 A1 | 4/2015 | Dua | |
| 2015/0127239 A1* | 5/2015 | Breed | B60R 21/0132 701/70 |
| 2016/0031450 A1* | 2/2016 | Wilson | G08G 1/0112 701/23 |
| 2016/0154113 A1* | 6/2016 | Leibner | G01S 19/21 342/357.59 |
| 2017/0041737 A1 | 2/2017 | Fischer | |

FOREIGN PATENT DOCUMENTS

| | | |
|---|---|---|
| WO | WO 2007/104982 A2 | 9/2007 |
| WO | WO 2010/011806 A1 | 1/2010 |
| WO | WO2012080741 A1 | 6/2012 |
| WO | WO 2015/160900 A1 | 10/2015 |

OTHER PUBLICATIONS

International Search report in PCT/US2016/016858 dated May 19, 2016.
PCT International Search Report and Written Opinion, PCT Application No. PCT/IB2017/050816, dated Apr. 20, 2017, 12 pages.

* cited by examiner

NETWORK COMPUTER SYSTEM FOR ANALYZING DRIVING ACTIONS OF DRIVERS ON ROAD SEGMENTS OF A GEOGRAPHIC REGION

RELATED APPLICATIONS

This application claims benefit of priority to Provisional U.S. Patent Application No. 62/296,297, filed Feb. 17, 2016; the aforementioned priority application being hereby incorporated by reference in its entirety.

BACKGROUND

There exists numerous on-board sensors in vehicles which can be used for remote monitoring and evaluation of drivers. For example, GPS components are often used to determine speed or congestion in traffic.

DETAILED DESCRIPTION

Examples include a network computer system and/or service which operates to remotely monitor vehicles to detect and characterize driving actions of drivers with respect to specific road segments of a roadway. Among other technical benefits, examples enable a network computer system to determine characterizations of a driving action (e.g., braking action) performed by multiple drivers at a specific road segment of a given region, and to also develop a baseline based on an aggregation of the characterizations.

In one implementation, a network computer system receives, over one or more networks, vehicle data from each of multiple vehicles that individually traverse a given road segment of a geographic region. The vehicle data of each of the multiple vehicles may be indicative of attributes of that vehicle's motion while the vehicle is traversing the given road segment. For each of the multiple vehicles, the vehicle data of that vehicle is used to determine a characterization for at least one driving action performed using that vehicle at the given road segment. The characterizations for each of the multiple vehicles are aggregated, and a baseline of the characterization is determined for the at least one driving action at the given road segment based at least in part on the aggregated characterizations.

As used herein, a client device includes a mobile computing device that is operated by a user of a transport arrangement system. In specific examples, a client device executes a service application, or is otherwise programmatically equipped to open and maintain a communication channel with a transport arrangement service that is provided over the Internet. Examples further provide for multiple classes of uses, including a rider class user and a driver class user.

By way of example, mobile computing devices, in context of client devices, can include cellular-capable devices, such as smartphones, feature phones, suitably capable laptops, notebooks, tablets (or hybrid devices or "phablets"), and/or other multi-functional computing devices capable of telephony/messaging. As another example, mobile computing devices can include portable (e.g., wearable devices, such as a smart watch) or vehicle mounted computing devices which can directly or indirectly (e.g., via a local wireline or wireless communication (e.g., Bluetooth) that serves as a proxy) communicate with network computer systems over one or more networks. In variations, a mobile computing device can include a roaming device, which is a device that can use a wireless link(s) (e.g., wireless connection implemented through a medium that uses a Bluetooth or 802.11 protocol; infrared; RF channel; Near-Field Communication ("NFC"), etc.) to access a network service over, for example, the Internet. By way of example, such devices can include tablet devices or wearable electronic devices which sometimes link with another device that can operate as a proxy.

While numerous examples provide for a driver to operate a mobile computing device as a client device, variations provide for at least some drivers to utilize and/or operate a vehicle communication device. A vehicle communication device can be implemented using, for example, custom hardware, in-vehicle devices, and/or suitable equipped devices that provide alternative On-Board Diagnostic ("OBD") functionality.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a computer-readable medium. Machines shown or described with figures below provide examples of processing resources and computer-readable mediums on which instructions for implementing embodiments of the invention can be carried and/or executed. In particular, the numerous machines shown with embodiments of the invention include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

System Description

Figure 1:
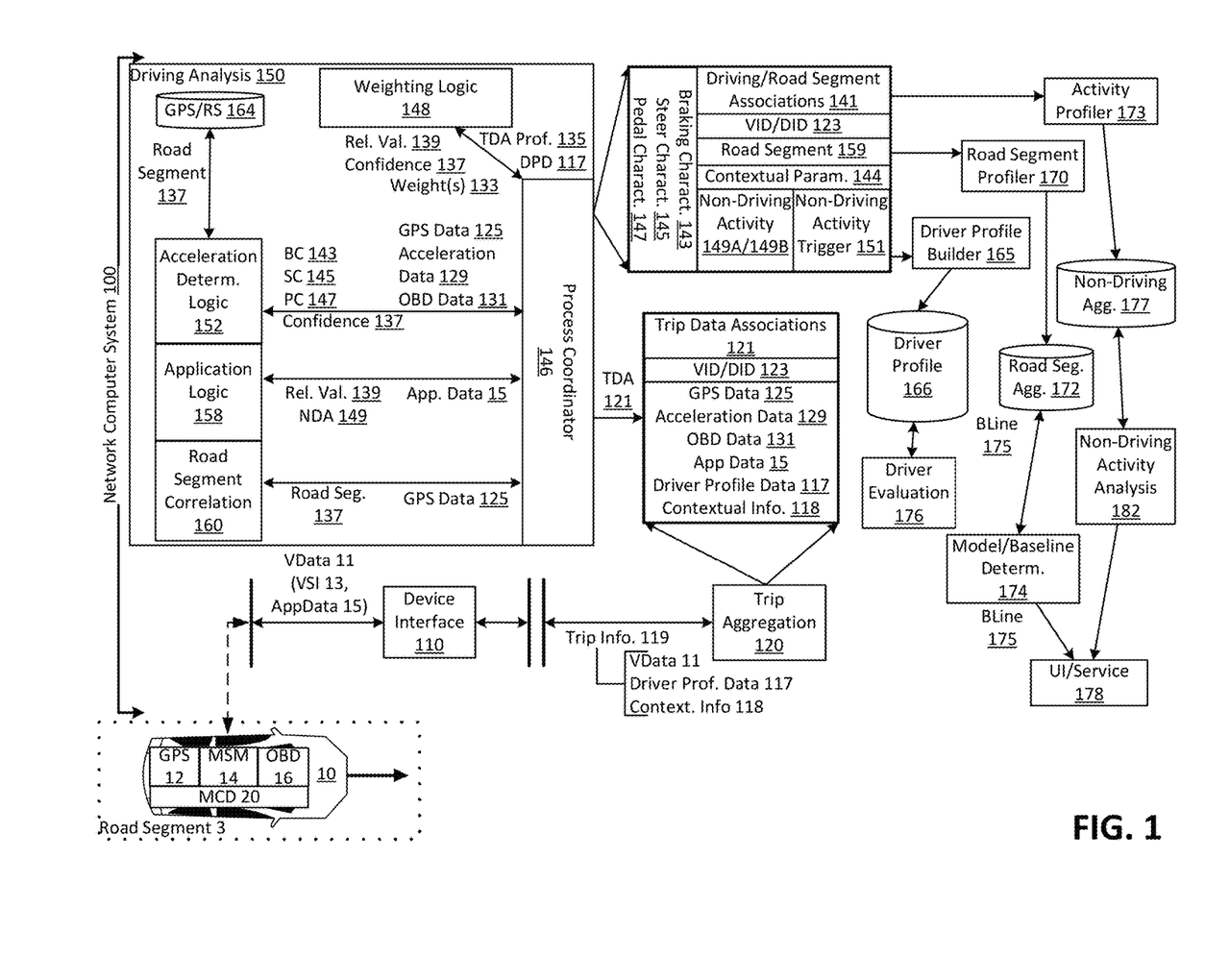
FIG. 1 illustrates a system for analyzing driving actions of drivers on road segments of a geographic region, according to one or more examples.

FIG. 1 illustrates a system for analyzing driving actions of drivers on road segments of a geographic region, according to one or more examples. In an example of FIG. 1, a network computer system 100 can operate to receive data transmitted from vehicles that are in motion and traversing respective portions of the geographic region in order to evaluate driving actions with respect to specific road segments. The network computer system 100 can operate as part of a network service, such as a transportation arrangement service in which vehicles are used to transport riders and/or packages, deliver items etc. Alternatively, the network computer system 100 can operate as an independent service that communicates with individual vehicles of the geographic region.

In some examples, the network computer system 100 operates by communicating with individual vehicles to receive data that is indicative of motion. In an example of FIG. 1, a vehicle 10 is representative of vehicles which can be remotely tracked for driver performance over a given geographic region. As shown, the vehicle 10 traverses a road segment 3, while a mobile computing device 20 operated by the driver communicates data which enables the tracking and evaluation. The mobile computing device 20 can include one or more motion sensing components 14, as well as a global positioning system ("GPS") component 12 or resource. By way of example, the mobile computing device 20 of vehicle 10 can include motion sensing components 14 that include a 3-axis accelerometer, a gyroscope, and/or an inertial measurement unit ("IMU" typically implemented using an accelerometer and gyroscope). In variations, the vehicle 10 uses a combination of devices and resources to obtain data indicative of attributes of the vehicles motion. For example, the vehicle 10 can include on board GPS 12 and/or an onboard diagnostic ("OBD") component 16.

According to some examples, the vehicle 10 can be operated by a driver who is associated (e.g., owner/user of computing device) with the mobile computing device 20. Furthermore, the mobile computing device 20 can execute a service application that, when executed, causes the mobile computing device 20 to transmit vehicle data 11 on a repeated or continual basis. The vehicle data 11 can include vehicle state information 13 and application data 15. The vehicle data 11 can include any data that is indicative of the vehicles motion, as provided by a resource that is included with or accessible to the mobile computing device 20. The vehicle state information 13 can include measurements made from within the vehicle 10, for an attribute of the vehicle's motion (e.g., velocity, forward acceleration, lateral acceleration). In some examples, the vehicle state information 13 can include measurements of velocity and/or acceleration, made through components such as an accelerometer, gyroscope, or IMU. In some examples, the vehicle data 11 may also include information determined from environmental sensors (e.g., barometric data, temperature data, etc.) of a vehicle.

In examples in which OBD component 16 is utilized, the vehicle state information 13 can include tachometer readings or other data measured through the vehicle's sensors. The mobile computing device 20 can, for example, interface with the OBD component 16 in order to obtain tachometer readings or other information, which can then be communicated over one or more networks to the network computer system 100. Still further, multiple components may communicate with the network computer system 100 at the same time, and/or independently of one another. For example, the vehicle 10 can be equipped with a wireless transceiver that enables the vehicle to transmit tachometer readings and other OBD information to the network computer system 100, independently of (or without use of) vehicle data 11 transmitted from the mobile computing device 20. In this way, the mobile computing device is able to generate information that has finer granularity and precision as compared to approaches which utilize position over time mapping (e.g., using GPS component 12).

With further reference to FIG. 1, the network computer system 100 includes device interface 110, trip aggregation 120 and driving analysis component 150. The device interface 110 can communicate with and receive vehicle data 11 from the vehicle 10 (via the mobile computing device 20). In some variations, the device interface 110 can be provided as part of a separate network service, such as a transportation service (e.g., service to arrange transportation for riders, shipping or delivery service, etc.), which operates with the network computer system 100 in evaluating driving behavior in road segments 3 of a given geographic region. The road segments 3 can be predefined, for example, based on roadway segments (e.g., stretch of freeway, city block), designated or selected roadway characteristics (e.g., bridges, intersections), and/or special characteristics (e.g., presence of landmarks). In some variations, the road segments 3 can be selected or narrowed through monitoring of driver actions (e.g., detecting hard braking occurrences by one or multiple drivers and correlating the braking to a road segment 3).

Among other functions, the device interface 110 can determine an identifier for the driver or the vehicle 10, based on communications that accompany the vehicle data 11 (e.g., through execution of a service application). The device interface 110 can link vehicle data 11 and other information obtained or calculated for vehicle 10 with an account maintained by, for example, a transport arrangement service. As described in greater detail, information determined about the driving behavior of a population with regards to specific road segments can be used to evaluate the performance of individual drivers, and results of such evaluation can also be stored or otherwise associated with the accounts of individual drivers for the transportation service.

The trip aggregation 120 can mark the start and end of a trip in order to aggregate trip information 119 for the vehicle 10 as it traverses a portion of the geographic region. In some examples, the trip aggregation 120 receives a continuous stream of vehicle data 11 for the vehicle 10 upon the device interface 110 detecting that the vehicle has started a trip. The trip aggregation 120 may also receive other data sets relevant to the vehicle's trip from either the vehicle 10, another network entity (e.g., device interface 110) or through retrieval from a third party network source (e.g., Internet weather portal). The various inputs to the trip aggregation 120 can be represented by the trip information 119, which can include the vehicle data 11 for the particular trip, as well as contextual information 118, driver profile information 117, and other types of information.

The contextual information 118 can be determined from a variety of sources and can be of various types. For example, the contextual information 118 may include time of day, day of week, and calendar day, as well as information about weather related conditions, traffic conditions, road conditions (e.g., damaged road, road repair, etc.), or events which may increase traffic or otherwise affect driving behavior. The sources of contextual information 118 can include, for example, the mobile computing device 20 (e.g., executing the service application and using network resources), internal components of the vehicle 10 and/or computing device 20 (e.g., GPS component 12 for timestamp), and/or from network side resources provided with the network computer system 100.

In some variations, the trip information 119 can include driver profile information 117, including data that identifies tendencies or driving characteristics of the driver based on prior evaluation or observation. The trip aggregation 120 can establish or maintain a data structure that stores associations of datasets for the vehicle 10 for a given time span ("trip association data set 121"). The trip association data set 121 can include associations between an identifier 123 and one or more of GPS data 125, OBD data 131, measured acceleration data 129, the application data 15, the contextual information 118, and/or the driver profile information 117.

The driving analysis component 150 can process the trip data associations 121 in order to generate a data set of processed data, including data that characterizes driving activity detected from the trip data associations 121. The driving analysis component 150 can augment, modify, append or otherwise create a separate data structure that maintains the processed and analyzed dataset, shown as driving and road segment associations 141. As described in greater detail, the driving/road segment associations 141 can link a characterization of a driving action performed by the vehicle 10 with a specific road segment which is traversed by the vehicle 10. The driving actions can include, for example, braking, pedal presses (or forward acceleration), steering, or non-driving activity (e.g., showing driver is distracted).

According to an example of FIG. 1, the driving analysis component 150 can include a process coordinator 146, weighting logic 148, one or more analysis components for analyzing the driving actions of the driver, and a road segment correlation component 160. The driving analysis component 150 can receive the trip data associations 121 as input, and use measured acceleration data 129 to detect and characterize one or more driving actions that are performed with the vehicle 10 as the vehicle traverses a corresponding portion of the geographic region. Still further, some examples provide that different types of data can be used determine a particular action. In particular, the driving analysis component 150 can be implemented to analyze trip information 119 from vehicles which have different types of resources for measuring attributes of the vehicle's motion. The driving analysis component 150 can evaluate the trip data associations in order to weight the determinations made for driving/road segment associations 141.

The process coordinator 146 represents a process, combination of processes or other logic which serve to sort, filter and/or select data sets of trip data associations 121 as inputs for other logic from which driving analysis component 150 makes determinations and characterizations of driving actions. In particular, the driving analysis component 150 utilizes vehicle acceleration determination logic 152 to determine when acceleration events occur with vehicle 10, as well as to label, classify or quantify the event (e.g., braking, accelerating forward, steering). The characterization of the activities can be semantic, quantitative, and/or categorical (e.g., "hard brake"). In determining acceleration events, the driving analysis component 150 can also validate the use of specific data sources, such as the accelerometer or IMU, for purpose of remotely detecting and characterizing driving actions.

The vehicle acceleration determination 152 can utilize data elements of the trip data associations 121 in order to (i) determine whether a driving action occurred at a given duration of time, (ii) determine the type of driving action (e.g., braking, pedal acceleration, steering), and/or (iii) and determine magnitude or other characterization of the determined driving action. At different intervals during the trip, the vehicle acceleration determination 152 may provide the process coordinator 146 with characterizations of driving actions, such as braking characterization 143, steering characterization 145, and/or pedal characterization 147.

In providing the characterizations, the vehicle acceleration determination 152 may also determine and maintain confidence values 137 for the determinations. Among other considerations, the confidence values 137 can reflect the type of motion sensing data used to determine the characterization. For example, the vehicle acceleration determination 152 can utilize acceleration input generated by an IMU, and separately evaluate the reliability of the acceleration input using GPS data 125 and/or OBD data 131. For some vehicles, no IMU data may be provided, in which case the vehicle acceleration determination 152 may use GPS data 125. Still further a smaller number of vehicles may provide both OBD data 131 and IMU data. The confidence value 137 can reflect the reliability determination for motion sensing input (e.g., IMU), as well as the type of input (e.g., GPS data 125 without IMU data, or IMU data with OBD data 131).

By way of example, the driving analysis component 150 can implement vehicle acceleration determination logic 152 to detect and characterize braking actions of the driver. In one implementation, the vehicle acceleration determination logic 152 can utilize measured acceleration data 129 as input, specifically to obtain a measurement of the acceleration over a given time span or distance. The vehicle acceleration determination logic 152 can use the measured acceleration data 129 to make a measurement of positive or negative acceleration in the direction of travel (representing pedal input by user or braking). The measured acceleration data 129 can also be used to make a determination of lateral acceleration, coinciding with a steering activity of the user. Examples recognize that while the measured acceleration data 129 can, when used appropriately, provide a fine grained calculation of vehicle acceleration on the roadway, such that braking events, steering events, and gas pedal events can be detected and labeled or categorized, the measured acceleration data 129 can also be unreliable because of the nature of the mobile computing device 20 (e.g., the device can move within the vehicle, or be operated by the user). Accordingly, the driving analysis component 150 can implement application logic 158 in order to make a determination as to whether the measured acceleration data 129 is unreliable for reason that the driver of the vehicle 10 was actively using the mobile computing device 20 when the measurements for measured acceleration data 129 were made.

As part of a determination relating to the reliability of the measured acceleration data 129, the process coordinator 146 can trigger application logic 158 to parse the application data 15 for markers or indicators of non-driving activity with respect to the mobile computing device 20. The presence of non-driving activity can signify, for example, activity that correspond to the user making a phone call, viewing a map, interacting with the mobile computing device 20, or moving the mobile computing device 20 from one position within the vehicle to another. As described with some examples, the presence of non-driving activity can be marked with indicators 149A. In variations, characterizations of non-driving activity (non-driving activity characterizations 149B) can also be separately analyzed for additional correlations.

The mobile computing device 20 can transmit the measured acceleration data 129 and the application data 15 with timestamps that would indicate when detected non-driving activity and measured acceleration data 129 occur at about the same time. In such cases, the non-driving activity indicator 149A is also an indicator that the measured acceleration data 129 is unreliable. In some implementations, the mobile computing device 20 can execute a service application, which can include programmatic controls of 100, in order to generate markers or other data with 15 in order to signify, with corresponding time stamps, the occurrence of events such as screen taps, button presses or other user activity. The application logic 158 can process the application data 15 for markers of such activity, which the service application can be programmed to record and transmit with vehicle data 11.

Still further, in some examples, the mobile computing device 20 and/or the vehicle 10 can be configured to adjust the reference frame of the mobile computing device 20 with that of the vehicle 10. For example, the mobile computing device 20 can be holstered within the vehicle 10, and further the mobile computing device 20 can include sensors or other resources to detect when the device is not holstered. Still further, the mobile computing device 20 can include programming to process its own sensor measurements from which the mobile computing device may infer vehicular movement.

As an addition or alternative, the GPS data 125 can be used to validate the measured acceleration data 129. For example, GPS data 125 obtained at a particular moment after a detected motion sensor input can reflect the vehicle 10 being located in a position that is either confirmatory or contradictory to a braking event.

Likewise, other data, such as OBD data 131 can also be used to determine confirmatory events or measurements for vehicle acceleration determination logic 152. The OBD data 131 can include, for example, tachometer readings which provide velocity, and over a given time period, the OBD data 131 can confirm or refute a determination that a particular action (e.g., braking) was performed. In variations, some vehicles generate alternative kinds of OBD data 131 to identify other types of confirmatory data, such as the vehicle's RPM readings or calculated engine load.

According to some examples, when an acceleration event corresponding to a driving activity of the driver is detected and characterized, the process coordinator 146 can use the GPS data 125 associated with the detected event to determine the road segment where the corresponding driver activity occurred. Road segment correlation component 160 can, for example, access a road segment/GPS database 164 that maps the GPS data 125 to a corresponding road segment 159. In one implementation, the process coordinator 146 manages the process by which the measured driver action is correlated to the road segment 159, based on 125 which accompanies the various sensor data used in determining the driver action.

The driving analysis component 150 can also implement weighting logic 148 to weight inputs of the 121 and/or outputs for driver/road segment associations 141. In an example shown, the weighting logic 148 can implement weights to influence contribution of certain types of data which may be transmitted from the vehicle 10. For example, if the IMU transmitted from the vehicle 10 is determined to be moderately or even significantly unreliable (e.g., based on a comparison of GPS data 125, velocity information provided from OBD data 131, etc.), then the acceleration determination logic 152 can be discounted through weighting logic 148. Likewise, if the application data 15 indicates a threshold level of user interaction with the 20, the weighting logic 148 can use application of weights to reduce the significance measured acceleration data 129.

The weighting logic 148 may also implement weights to reduce or increase the effects measured acceleration data 129 based on, for example, contextual information 118, such as driver profile information and/or weather information. The driver profile information can indicate a propensity of a given driver to drive in a particular manner, so that in some cases, driver profile information can confirm or refute the determination of acceleration determination logic 152 based on the measured acceleration data 129. Likewise, contextual information 118 such as provided by weather, or alternatively time of day or day of week, can also result in weights which influence the outcome of the driving analysis component 150.

With reference to an example of FIG. 1, the driving/road segment associations 141 created by the driving analysis component 150 can associate the vehicle or driver identifier 123 and the road segment 159 with one or more characterizations of driver action. By way of example, the associations can be for a braking characterization 143, a steering characterization 145, a pedal characterization 147, or other types of activity.

In some variations, driving/road segment associations 141 also associates one or more contextual parameters 144, as determined from the contextual information 118, with the vehicle or driver identifier 123, road segment 159 and/or multiple various driver actions. Driving/road segment associations 141 can, for example, semantically identify a weather or traffic condition which can affect the driving of the driver. The contextual parameters 144 can also identify the time of day, day of week, calendar day and various other information to correlate the measured driving actions of the rider with time, day of week, date of month, etc. In such examples, the contextual parameters 144 can be implemented as a label or categorization that accompanies the determined action. Other information, such as OBD data 131 (e.g., velocity) or driver profile information can be carried and/or utilized with the driving/road segment associations 141.

The process coordinator 146 can maintain and update the driving/road segment associations 141 for a given duration (e.g., trip duration for vehicle 10). In one implementation, the process coordinator 146 can structure the trip data associations 121 into time intervals, then select and sort elements of trip data associations 121 for evaluation by the vehicle acceleration determination 152, the application logic 158 and the road segment correlation 160. For specific time intervals, the process coordinator 146 can record determinations and characterizations of the vehicle acceleration determination 152 and/or application logic 158, and further associate the determinations with the particular road segment 143 as determined by the application logic 158. In this way, the driving/road segment associations 141 can provide a chronology of events relating to driver actions over the course of a trip.

The process coordinator 146 can also selectively implement the weighting logic 148 on the determinations of the vehicle acceleration determination 152, the application logic 158 and the road segment correlation 160, so that the characterizations recorded with the driving/road segment associations 141 reflect weights 133 calculated from the weighting logic 148.

The process coordinator 146 can apply weighting logic 148 to weight the determinations and characterizations generated by the vehicle acceleration determination 152 and the application logic 158. The weights 133 can normalize the data elements of driving/road segment associations 141 for accuracy and granularity against similar data obtained for other drivers of a population in the geographic region. In one implementation, the weighting logic 148 can utilize the confidence values 137 determined by the vehicle acceleration determination 152 in order to determine weights 133 for one or more of the characterizations. The application logic 158 can also generate a reliability value 139 which can, for example, reflect confirmation, uncertainty or invalidity of the motion sensing values used by the vehicle acceleration determination 152 based on the premise that a user interaction with the mobile computing device 20 may be at least partially responsible for the motion sensing values generated from the vehicle 10.

Other elements of the trip data associations 121 can also be used for determining weights 133. For example, the driver profile information 117 can be used to influence weights 133 in a manner that reflects a propensity for or against a particular driver action based on prior observed behavior of the driver. Still further, the weighting logic 138 can generate weights 133 based on the profile of the trip data associations 121. For example, the weights 133 can reflect the type of motion sensing data provided from the mobile computing device 20 (e.g., accelerometer without gyroscope). More specifically, the motion sensing data can reflect the quality or granularity of the motion sensing data provided from the vehicle 10.

The network computer system 100 can include components to aggregate data elements of driving/road segment associations 141, determined for numerous remotely monitored drivers. In this manner, over time, data may be collected that can generalize how a population of drivers performs one or more driving actions in a given road segment of a geographic region. For example, if the road segment is specific to an intersection, driving/road segment associations 141 of individual drivers can reflect (i) a braking characterization 143, which can include, for example, a numeric categorization of braking magnitude (e.g., score of 1 to 10 reflecting severity of braking); (ii) a pedal characterization 147, reflecting a separate numeric categorization of forward acceleration by the given driver from the intersection; and (iii) a steering characterization 145, reflecting when or if a given driver makes a lane change or turn at the intersection.

The characterizations 143, 145, 147 can be structured or formatted in a manner that permits the values to be aggregated with like values from other drivers who traverse the same road segment. In some examples, the road segment profiler 170 includes processes to aggregate and store the data elements of driving/road segment associations 141 as part of a road segment aggregation database 172. Road segment aggregation database 172 can provide aggregations for the characterizations 143, 145, 147 from numerous drivers which are specific to individual road segment. In this way, road segment aggregation database 172 can provide aggregate characterizations for braking, accelerating and steering for an individual road segment.

In one implementation, the aggregations of the characterizations 143, 145, 147 can be in the form of, or based on a statistical distribution, showing average values (e.g., average braking value for intersection), medians, and statistical deviations. A baseline/model determination component 174 can process the aggregations in order to determine a baseline value 175 for a specific driving action at a particular road segment. Model/baseline determination component 174 can determine or generate models and baseline values for the road segments, which can then be shared with a population of the geographic region in order to enhance safety, predictability and overall understanding of the roadway amongst drivers in the population.

In some implementations, the aggregation of the characterizations can include correlations to contextual parameters 144, such as time of day, day of week, weather, roadway repair, or other events which can potentially affect traffic or the manner in which individuals drive. Thus, model/baseline determination component 174 can determine separate baseline values 175 for different contextual parameters.

In some examples, individual drivers can be evaluated by comparing vehicle data 11, transmitted from devices within respective vehicles of the individuals, against the baseline values as determined from aggregations of driving actions from a population of drivers. Drivers may be evaluated for specific road segments and specific types of driving actions. In some examples, drivers may also be evaluated based on comparisons of their respective non-driving actions to a baseline or model of the population of drivers. In some implementations, the driving/road segment associations 141 can be used to evaluate individual drivers against baseline values 175 of corresponding road segments. In one implementation, a driver profile builder 165 can retrieve data elements of driving/road segment associations 141 for building a driver profile store 166. A driver evaluation component 176 can compare the driving action of the driver against the baseline value(s) for the same road segments to determine, for example, how the driver's braking, forward acceleration or steering compared to other drivers of the population. The comparison can then be used to, for example, rate the driver, characterize the driver's style for a given driving action or overall ability, and/or advise the driver to improve ability and safety.

Still further, in some examples, vehicle data 11 can be validated through comparison with baseline values determined from the population of drivers. The validation of vehicle data 11 from specific vehicles can include a determination as to whether the vehicle data 11 (e.g., GPS data transmitted from a vehicle over a given duration of time) of a given vehicle is spoofed. Spoofing of GPS data can occur when unscrupulous drivers who are to be compensated for driving generate false GPS data rather than operate their respective vehicles. The comparison of vehicle data 11 to baseline values can, for example, determine anomalies which are not possible had the given vehicle actually traversed a road network as indicated by the GPS data. As an example, the speed by which a given vehicle traverses a steep hill may be deemed unlikely, given comparisons to baseline values. As another example, the vehicle data 11 of a given vehicle may include barometric data which is not consistent with the corresponding baseline values because the corresponding baseline values change as a result of altitude changes in the road segment the given vehicle is shown to traverse.

While some examples provide for evaluating driving actions, in variations, network computer system 100 can be extended to detect distracted driving behavior, and correlate such behavior with specific triggers. In particular, network computer system 100 may detect driver interaction with the mobile computing device 20, and then correlate the interaction through particular source, such as an application, application feature or other cause.

With reference to an example of FIG. 1, trip information 119 may include application data 15, specifically data recorded from processes on the mobile computing device 20 that different types of interactions between driver and mobile computing device. By way of example, the service application may record input events, including events of different types (e.g., voice inputs, screen taps, button presses), state changes of monitored applications (e.g., application launch, content rendering, etc.), and sensor inputs that indicate the user may be viewing or otherwise paying attention to the mobile computing device 20 in a manner that would be distracting (e.g., accelerometer indicates the use is holding the mobile computing device in an upward position). Additionally, some types of mobile computing device use may be conditionally regarded as distracting, depending on a state of the mobile computing device and or other factors such as the location or type of driving that is being performed. For example, placing a phone call with the mobile computing device 20 may be regarded as distracting if done while the user is holding the device, and potentially not distracting if done through voice commands and the vehicles audio output system. The application state (e.g., whether connected to the vehicles audio system) and log of sensor inputs (e.g., voice input, accelerometer input etc.) can also be analyzed to characterize the driver's phone call as a distraction.

In some examples, a service application (e.g., see FIG. 3) can record and transmit, as part of the application data 15, an activity log that includes input events, sensor inputs, application states and changes thereof. The activity log can further timestamp the recording of such information so that the information can be analyzed in view of a common timeline. Moreover, the application data 15, including the activity log can be time stamped to match a timeline of motion sensing data, which can also be transmitted to the network computer system 100.

As described with other examples, the application logic 158 can operate with a network computer system 100 to parse and analyze the application data 15, and further to determine the occurrences of distractions, the incidents of which can be reflected by non-driving indicators 149A. Additionally, the application data can be analyzed to characterize the non-driving activity, shown by non-driving activity characterizations 149B.

In some examples, the non-driving activity characterizations 149B reflect information about the user's interaction, as well as the trigger or source for receiving the user interaction. For example, an activity log may identify a specific program or application that was launched, or application feature that received user input while the vehicle was in motion. In some variations, the service application can include logic which characterizes input events, sensor events and application state changes so that the output of the mobile computing device 20 detects and/or self-characterizes at least some of the interactions which are deemed distractions.

The non-driving activity characterizations 149B can be in different forms, including quantitative expressions, semantic labels and/or variations thereof. In some examples, the characterizations 149B can reflect the quantity, intensity, duration and/or type of interaction in the context of a distraction. For example, a numeric category can characterize the distraction by severity and/or by duration, type etc.

According to some examples, the driving analysis component 150 can store the non-driving activity characterizations with the driving/road segment association 141. As an addition or variation, the driving analysis component 150 can also separately associate the non-driving activity indicators 149A and characterizations 149B with the determined trigger 151 (when known or appropriate).

The occurrence and/or characterizations of the non-driving activity 149A, 149B (including triggers 151) can be recorded by an activity profiler 173 and stored in an activity aggregation database 177. The non-driving activity information can be aggregated with like characterizations of non-driving activity from other drivers. Such characterizations can be aggregated by, for example, the associated trigger 151.

The non-driving activity analysis component 182 represents logic that can perform further analysis on the database of aggregated interactions. When distracted driver monitoring is expanded for a population, the aggregations of the non-driving activity and characterizations can detect when (or predict if) a particular occurrence caused (or may cause) an increase in the incidents of distracted driving. For example, software developers can time the release of their application updates to avoid increasing the amount of distracted driving. In some examples, a developer service 178 can receive input from the non-driving activity analysis component 182, in order to communicate timing to a developer (or developers) as to when new functionality should be provided. In one implementation, the developer can roll the update out through an A/B testing protocol, and thus monitor the population where updates are provided for an increase an incidents of distracted driving. The monitoring performed through the developer service 178 can identify a specific feature or functionality that is a source of distraction, as well as context or timing when the feature roll out can raise distracted riving incidents. The developer service 178 can also implement new functionality when corresponding vehicles are located in a safe location. The nexus of software development and distracted driving can be of more concern when transport related services roll out new versions of applications which drivers actively use (e.g., navigation software).

With further reference to an example of FIG. 1, the data structures for the trip data associations 121 and/or the driving and road segment associations 141 can be maintained with high availability memory resources (e.g., cache or DRAM), so that the respective datasets continue to aggregate while the vehicle progresses on a trip. In some implementations, the processing of trip aggregation 120 and driving analysis component 150 can be sufficiently responsive, so that the trip data associations 121 and driving and road segment associations 141 are updated in near real time with respect to the vehicle's progression. In variations, the processing of trip aggregation and driving analysis component 150 can occur on an alternative timeline as compared to the trip undertaken with vehicle 10. For example, the vehicle 10 can transmit data corresponding to the trip data associations 121 sometime after the trip is complete. Similarly, the determinations of driving/road segment associations 141 can be made some time period after the trip is complete.

Figure 2A:
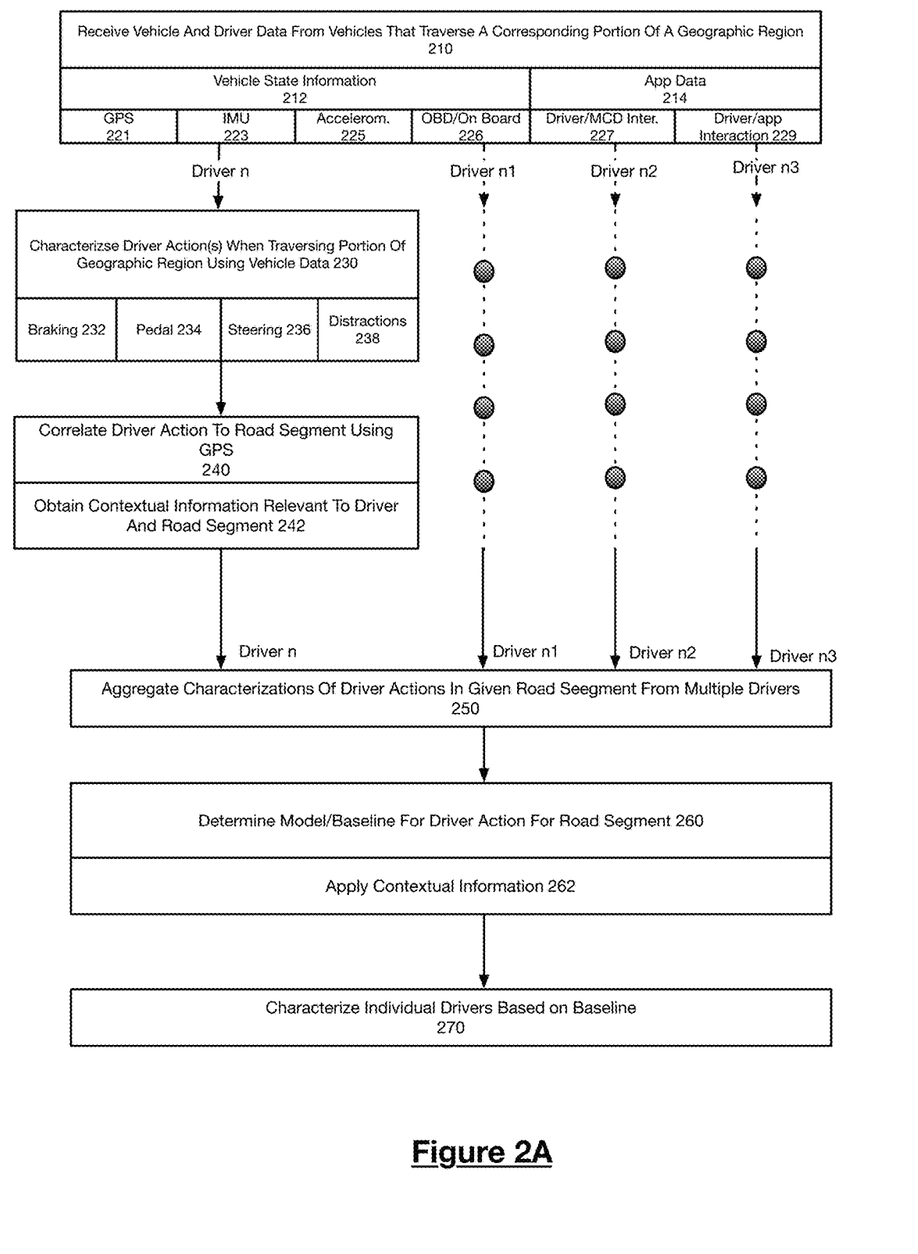
FIG. 2A illustrates an example method for characterizing behavior amongst a population of drivers for specific road segments of a geographic region.
Figure 2B:
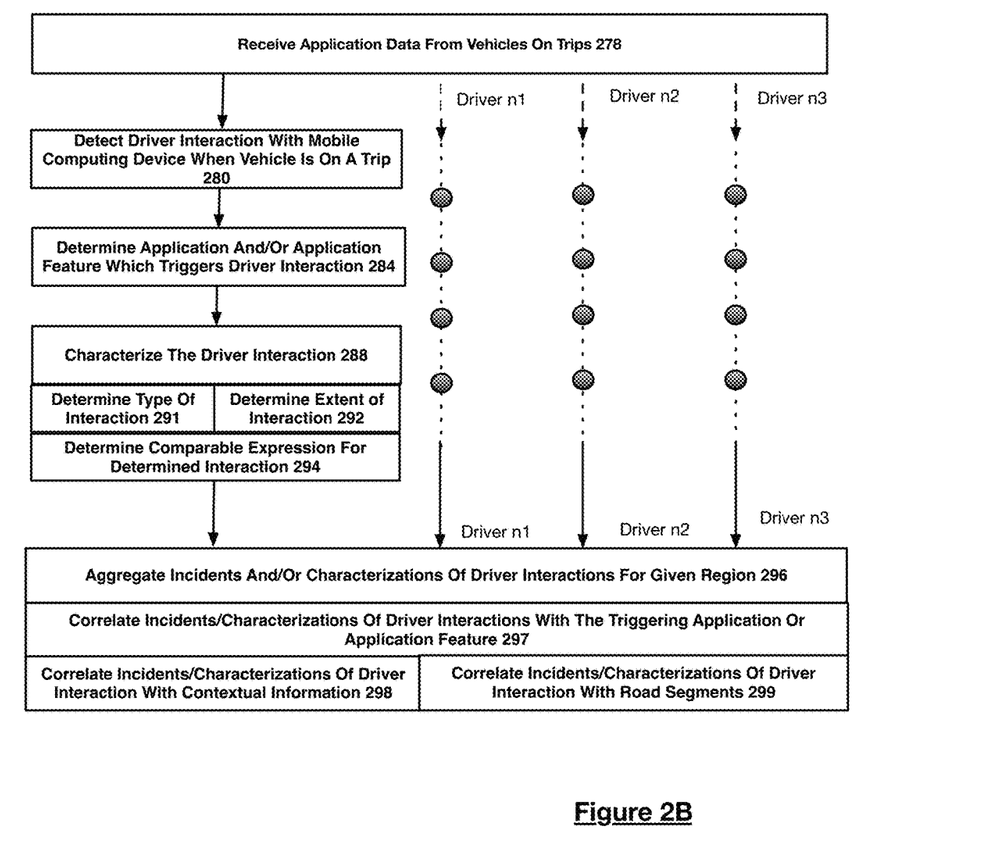
FIG. 2B illustrates an example method for determining sources of distractions amongst a population of drivers.

FIG. 2A illustrates an example method for characterizing behavior amongst a population of drivers for specific road segments of a geographic region. FIG. 2B illustrates an example method for determining sources of distractions amongst a population of drivers. Examples of FIG. 2A and FIG. 2B can be implemented using, for example, network computer system 100 of an example of FIG. 1. Accordingly, reference may be made to elements of FIG. 1 for purpose of illustrating a suitable component for performing a function or operation being described.

With further reference to an example of FIG. 2A, the network computer system 100 receives vehicle data 11 from vehicles that traverse a portion of a geographic region (210).

The vehicle data 11 can be received continuously from, for example, select vehicles of the population which carry mobile computing devices on which a service application under programmatic control of the network computer system 100 is deployed. The vehicle data 11 can include vehicle state information 13 (212) and application data 15 (214). The vehicle state information 13 can include location information (e.g., such as determined by GPS, or through other localization-position determination resources) (221), motion sensing data, such as provided by an IMU (223), accelerometer (225) and/or OBD resources (e.g., tachometer readings). The application data 15 can include data generated from a service application executing on the mobile computing device 20, which records and timestamps a user interaction with the mobile computing device 20. For example, a service application can record interactions through a user interface of the application (229), or alternatively, through any interface of the mobile computing device 20 (227). Some variations can also record information with the interaction that identifies or characterizes the interaction, such as for driving related use (e.g., driver viewing GPS or map) or for extraneous use (e.g., texting).

For individual drivers (n, n1, n2, etc.) of the population, driving actions are characterized as the individual's vehicle traverses a corresponding portion of the geographic region (230). The characterizations can, for example, include numerical categorizations indicating severity of the driving action (e.g., hard brake, gradual turn, etc.). The type of interactions that can be detected and characterized include, for example, braking (232), pedal (or forward acceleration) (234) and/or steering (236). As described with an example of FIG. 1, the driving actions can be determined and characterized using vehicle state information 13, which may include measurements from within the vehicle using motion sensing components such as IMU/accelerometer or OBD.

In some variations, the driver's distraction level may also be characterized using, for example, the application data 15 (238). For example, a numeric quantity can express an approximation of the user's distraction level, based on the duration, intensity, and type (e.g., which application) of interaction the user has with the mobile computing device For each driver, specific driver actions can be correlated to individual road segment (240). For example, the trip data associations 121 can group motion sensor data and GPS data by timestamp, so that subsequently determined and characterized driving actions can be correlated to individual road segments.

In some variations, the driver action can also be correlated to a contextual parameter (242), which can be determined from, for example, the application data 15, a local network resource or a third-party resource. For example, the GPS data 12 and associated time stamps can be used to determine contextual information corresponding to any one or more of time of day, day of week, calendar day, weather, traffic, roadway conditions, special events, etc. The network computer system 100 can include logic that maps or abstracts specific contextual information (e.g., drizzling) to a corresponding contextual parameter (e.g., numeric value for severity and type of precipitation).

The network computer system 100 can aggregate characterizations of driver actions from multiple drivers for given road segments of the geographic region (250). The aggregations can, for example, form a statistical distribution from which further analysis can be provided.

In one example, a model or baseline is determined for a specific driving action performed in individual road segments of the geographic region (260). In some variations, the baseline or model is further made specific to contextual parameters (e.g., time of day, day of week, weather classification, etc.) (262).

The baseline or model can be applied for multiple purposes. For example, a statistical distribution with average values (representing the severity of the driving action performed) can inform a municipality, a population and/or individual drivers of road segments which are potential traffic hazards. Likewise, road segments which have a broad range of values can indicate a road segment that raises additional safety challenges for particular driving styles or contextual parameters.

According to some examples, individual drivers may be evaluated against the model or baseline determined for the population of drivers (270). By comparing a driver to a baseline or model, the driver can be evaluated for specific driving actions and contextual parameters which are normalized for the corresponding road segments. This can provide a more accurate evaluation of driver performance, with additional depth of information being provided by understanding each driver's tendencies for multiple driving actions. Moreover, the severity of the driver action can be calibrated based on the road segment, so as to provide a more accurate understanding of the driver performance. For example, drivers of transportation services, such as on-demand transport arrangement services, can be remotely monitored for accurate, geographically and contextually relevant evaluations done through remote and transparent processes, yielding a true and accurate understanding of driver performance.

With reference to FIG. 2B, the network computer system 100 may receive application data 15 from numerous vehicles that are on trips (278). The trip application data 15 can be received for vehicles in a common geographic region, as well as vehicles which are in different geographic regions. For individual drivers, their interaction with their respective mobile computing device 20 can be detected with receipt of trip information 119, which correlates the application data with other data for vehicles which are on trips.

The network computer system 100 can detect from the application data 15 when the user is performing a non-driving activity, such as actively interacting with the mobile computing device, or holding or viewing the device (280). When a distraction of a non-driving activity is detected, the trigger 251 or source of the distraction can also be identified (284). This can correspond to the application or feature what received the user interaction.

The driver's non-driving interaction can be characterized (288), such as by type (291), duration and severity (292). An expression of the characterization can be determined (294), such as a label or numeric expression (e.g., number between 1 and 10). The expression can be determined for the non-driving interaction as a whole, as well as for a particular attribute such as the severity of duration.

While some examples provide for the driver analysis component 150 to characterize the non-driving interaction, in variations, some or all of the determinations can be performed on the mobile computing device 20, such as through the execution of the service application.

The characterizations of the non-driving interactions can be aggregated (296).The aggregations can be sorted or otherwise correlated to a source or trigger (297). Additionally, the non-driving interactions can be correlated to other information which can be determined by the network computer system 100, including contextual parameters 144 and/or road segments which can also be correlated to driver actions. The aggregations of such values can identify, for example, contextual events and/or road segments which may, for example, raise a propensity of distraction amongst drivers.

Figure 3:
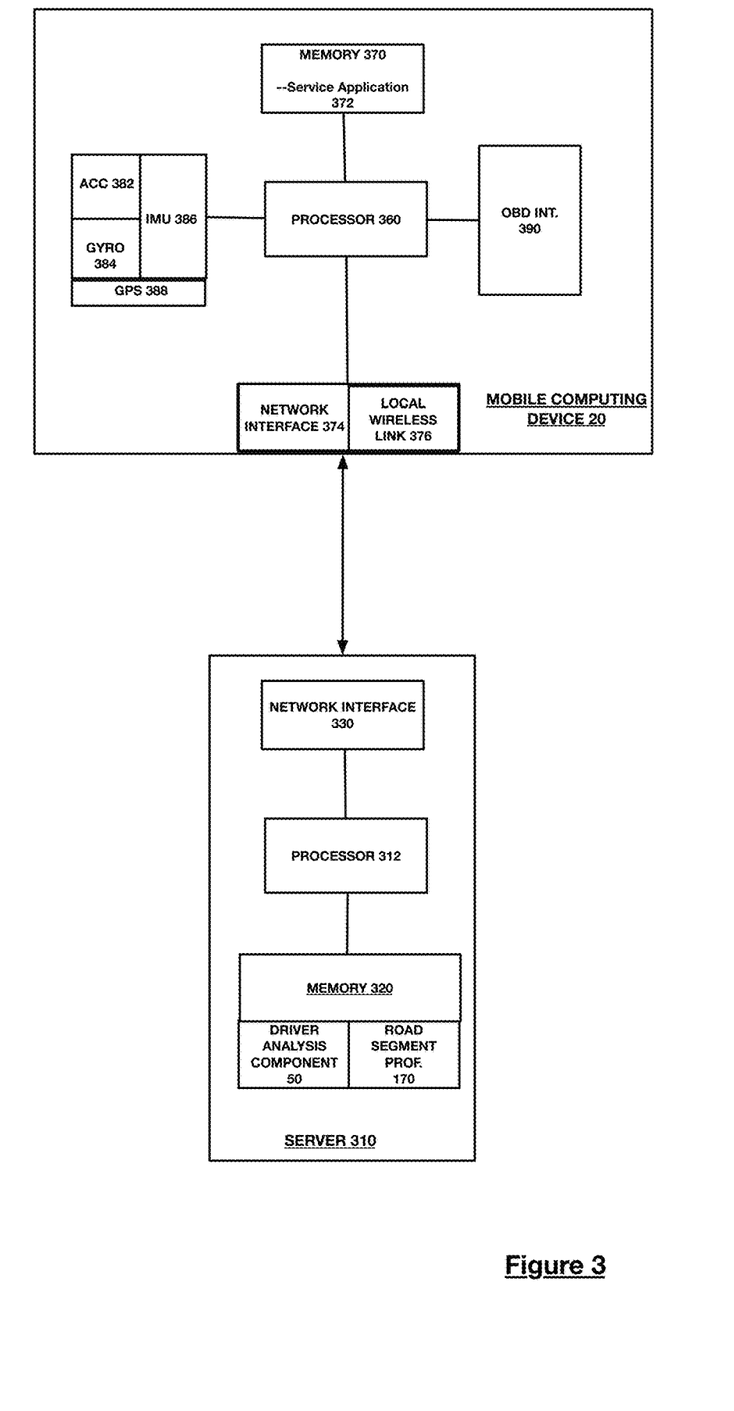
FIG. 3 illustrates a computer system on which some examples may be implemented.

FIG. 3 illustrates an example system for characterizing behavior amongst a population of drivers for specific road segments of a geographic region. FIG. 3 illustrates a computer system on which some examples may be implemented. In an example of FIG. 3, a system 300 includes the mobile computing device 20 and one or more servers 310, on which, for example, the network computer system 100 may be implemented. The server 310 can include one or more processors 312, memory 320, and a network interface 330 from which the server 300 can exchange communications with other computing entities, including the mobile computing device 20. The memory can store components of network computer system 100, such as driving analysis component 150 and/or road segment profiler 170 of FIG. 1. Communications with the mobile computing device 20 can involve wireless communication links, such as provided through a cellular network, as well as Internet or other network based communications.

According to some examples, the mobile computing device 20 includes a processor 360, a memory 370, a network interface 374 (e.g., a cellular or wireless transceiver), motion sensing components as shown by a 3-axes accelerometer 382, gyroscope 384, and IMU 386. The mobile computing device 20 may also include a location determination resource, such as provided by GPS component 388. In variations, the location determination resource can include locality determination components, which use imaging, laser, or other sensors in combination with mapping to determine more precise (or less granular) location information.

In some variations, the mobile computing device 20 may also include an OBD interface 390 for communicating with OBD equipment of the corresponding vehicle. For example, the mobile computing device 20 can use a wireless local link 376 (e.g., Bluetooth) to establish and receive OBD data 131 from the vehicle in motion, and then use the network interface 374 to transmit vehicle data 11 (which would include the OBD data 131 of FIG. 1).

In some examples, the memory 370 stores instructions for implementing a service application 372. The service application 372 can include instructions, which when retrieved from memory 370 and executed by the processor 360, causes the processor 360 to retrieve data from the motion sensing components, the OBD interface 390 and/or the GPS component 338. The service application 372 can perform its functioning while implementing programmatic controls provided from the network computer system 100. For example, the service application 372 may be made available from the network computer system 100, so as to include processes that are inherently under control of the network computer system 100. Among other control and functions, the service application 372 can execute transparently, and without user modification or interference, in order to obtain and transmit various forms of the vehicle data 11. Thus, when the service application 372 is operating on a given mobile computing device 20, the data retrieved and communicated to the network computer system 100 can be assumed as being uncompromised.

While some examples such as shown by FIG. 3 describe a network computer system for implementing functionality provided with examples herein, in variations, other computing platforms can implement some or all of the functionality of the network computer system 100. For example, in some variations, the mobile computing device 20, or alternatively a work station or personal computer of a driver can implement functionality described with the network computer system 100.

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

What is being claimed is:

1. A method for identifying fraudulent vehicle driving data, the method being performed by one or more processors and comprising:

receiving, over one or more networks, vehicle data from multiple computing devices, each computing device associated with a corresponding vehicle of multiple vehicles that individually traverse a given road segment of a geographic region, the vehicle data received from each computing device including sensor-based vehicle state information for the vehicle the computing device is associated with and data indicative of one or more attributes of that vehicle's motion while the vehicle is traversing the given road segment, the data indicative of one or more attributes of that vehicle's motion including Global Positioning System (GPS) data;

for each of the multiple vehicles, determining, based on the vehicle data of that vehicle, a characterization of at least one driving action performed using that vehicle at the given road segment and a confidence value associated with each characterization, wherein each confidence value indicates a reliability level of the associated characterization;

aggregating the characterizations and confidence values determined for the multiple vehicles;

determining, for the given road segment, a baseline or model characterization for the at least one driving action based at least in part on the aggregated characterizations and confidence values;

receiving new vehicle data from an additional vehicle, the new vehicle data including GPS data indicating that the additional vehicle traversed the given road segment and data indicative of one or more attributes of the additional vehicle's motion while the additional vehicle is traversing the given road segment;

determining, based on the new vehicle data of the additional vehicle, a characterization of at least one driving action performed using the additional vehicle at the given road segment;

identifying, based on the characterization of the driving action performed using the additional vehicle and the baseline or model characterization for the at least one driving action, that the characterization of the driving action performed using the additional vehicle represents anomalous vehicle data, wherein the characterization of the driving action performed using the additional vehicle represents anomalous vehicle data if the characterization of the driving action performed using the additional vehicle differs from the baseline or model characterization for the at least one driving action by more than a threshold amount;
determining, based on the identified anomalous vehicle data, that the received new vehicle data is spoofed;
identifying a driver of the additional vehicle; and
evaluating the driver based on the determination that the new vehicle data is spoofed.

2. The method of claim 1, wherein each computing device is located within or attached to the corresponding vehicle.

3. The method of claim 1, wherein the characterization of at least one driving action performed using the additional vehicle includes a numerical categorization.

4. The method of claim 1, wherein the baseline or model is based on a statistical distribution.

5. The method of claim 1, further comprising:
communicating information corresponding to the baseline or model characterization to a group of drivers within the geographic region.

6. The method of claim 1, further comprising:
determining, from the baseline or model, one or more road segments of the geographic region which include a road hazard.

7. The method of claim 5, further comprising:
obtaining contextual information in conjunction with vehicle data that is received from each of the multiple vehicles; and
wherein determining the baseline or model characterization includes determining the baseline or model characterization based at least in part on a context identified from the contextual information.

8. The method of claim 7, wherein the identified context includes one or more of: time of day, day of week, month of year, weather condition, temporary road condition, or a public event in the geographic region.

9. The method of claim 8, wherein the baseline characterization is specific to the identified context.

10. The method of claim 1, wherein the vehicle data includes vehicle state information determined from a motion measuring component that resides within each of the vehicles.

11. The method of claim 10, wherein the motion measuring component of at least one of the multiple vehicles includes at least one of an accelerometer or inertial measurement unit ("IMU") that is provided within a mobile computing device of a driver of that vehicle.

12. The method of claim 1, wherein receiving the vehicle data includes receiving multiple types of vehicle state information from the multiple vehicles, each type of vehicle state information corresponding to one of Global Positioning System ("GPS") data, accelerometer data, gyroscopic data, or inertial measurement unit ("IMU") data.

13. The method of claim 12, wherein determining the characterization of at least one driving action includes determining a magnitude of an acceleration action performed by the driver.

14. The method of claim 13, wherein the acceleration action corresponds to a braking action or a steering action of the driver.

15. The method of claim 13, wherein the acceleration action corresponds to a pedal action of the driver.

16. The method of claim 1, further comprising:
evaluating a driving performance of a driver of each of the multiple vehicles based at least in part on a comparison of the characterization of the driving action that is determined for the vehicle of that driver and the baseline of the characterization.

17. The method of claim 1, wherein determining the characterization of the at least one driving action includes:
(a) communicating with a mobile computing device of a driver of each of the multiple vehicles to obtain vehicle state information;
(b) determining a characterization of each of multiple driving actions performed by the driver of each of the multiple vehicles;
(c) correlating at least one of the multiple driving actions performed by the driver of each of the multiple vehicles to one of a plurality of road segments for the geographic region.

18. The method of claim 1, wherein determining, from the new vehicle data of the additional vehicle, a characterization of at least one driving action performed using the additional vehicle at the given road segment, comprises determining an associated confidence value indicating a reliability level of the associated characterization, and wherein identifying that the characterization of the driving action performed using the additional vehicle represents anomalous vehicle data, is further based on the associated confidence value.

19. The method of claim 1 wherein determining the baseline or model comprises assigning a weight to each of the aggregated characterizations based at least in part on the associated confidence value, the contribution of a particular characterization to the baseline or model being based on the weight assigned to the particular characterization.

20. A computer system comprising: a network computer system; and
a plurality of service applications which individually execute on a computing device that is carried within a vehicle, each service application of the plurality of service applications being under programmatic control of the network computer system to
(i) interface and obtain vehicle data from one or more components on the computing device or accessible to the computing device within the vehicle, and
(ii) transmit the vehicle data to the network computer system over one or more networks;
wherein the network computer system includes one or more processors and a memory to store instructions, the instructions causing the one or more processors to:
receive, over one or more networks, vehicle data from multiple computing devices, each computing device associated with a corresponding vehicle of multiple vehicles that individually traverse a given road segment of a geographic region, the vehicle data received from each computing device being indicative of one or more attributes of the motion of the vehicle the computing device is associated with while the vehicle is traversing the given road segment, the vehicle data including Global Positioning System (GPS) data;
for each of the multiple vehicles, determine, based on the vehicle data of that vehicle, a characterization of at least one driving action performed using that vehicle at the given road segment and a confidence value associated with each characterization, wherein each confidence value indicates a reliability level of the associated characterization;
aggregate the characterizations and confidence values determined for the multiple vehicles;
determine, for the given road segment, a baseline or model characterization for the at least one driving action based at least in part on the aggregated characterizations and confidence values;

receive new vehicle data from an additional vehicle, the new vehicle data including GPS data indicating that the additional vehicle traversed the given road segment and data indicative of one or more attributes of the additional vehicle's motion while the additional vehicle is traversing the given road segment;

determine, based on the new vehicle data of the additional vehicle, a characterization of at least one driving action performed using the additional vehicle at the given road segment;

identify, based on the characterization of the driving action performed using the additional vehicle and the baseline or model characterization for the at least one driving action, that the characterization of the driving action performed using the additional vehicle represents anomalous vehicle data, wherein the characterization of the driving action performed using the additional vehicle represents anomalous vehicle data if the characterization of the driving action performed using the additional vehicle differs from the baseline or model characterization for the at least one driving action by more than a threshold amount;

determine, based on the identified anomalous vehicle data, that the received new vehicle data is spoofed;

identifying a driver of the additional vehicle; and evaluating the driver based on the determination that the new vehicle data is spoofed.

21. A non-transitory computer-readable medium that stores instructions, which when executed by one or more processors, cause a computing system of the one or more processors to perform operations that include:

receiving, over one or more networks, vehicle data from multiple computing devices, each computing device associated with a corresponding vehicle of multiple vehicles that individually traverse a given road segment of a geographic region, the vehicle data received from each computing device being indicative of one or more attributes of the motion of the vehicle the computing device is associated with while the vehicle is traversing the given road segment, the vehicle data including Global Positioning System (GPS) data;

for each of the multiple vehicles, determining, based on the vehicle data of that vehicle, a characterization of at least one driving action performed using that vehicle at the given road segment and a confidence value associated with each characterization, wherein each confidence value indicates a reliability level of the associated characterization;

aggregate the characterizations and confidence values determined for the multiple vehicles;

determine, for the given road segment, a baseline or model characterization for the at least one driving action based at least in part on the aggregated characterizations and confidence values;

receive new vehicle data from an additional vehicle, the new vehicle data including GPS data indicating that the additional vehicle traversed the given road segment and data indicative of one or more attributes of the additional vehicle's motion while the additional vehicle is traversing the given road segment;

determine, based on the new vehicle data of the additional vehicle, a characterization of at least one driving action performed using the additional vehicle at the given road segment;

identify, based on the characterization of the driving action performed using the additional vehicle and the baseline or model characterization for the at least one driving action, that the characterization of the driving action performed using the additional vehicle represents anomalous vehicle data, wherein the characterization of the driving action performed using the additional vehicle represents anomalous vehicle data if the characterization of the driving action performed using the additional vehicle differs from the baseline or model characterization for the at least one driving action by more than a threshold amount;

determine, based on the identified anomalous vehicle data, that the received new vehicle data is spoofed;

identifying a driver of the additional vehicle; and evaluating the driver based on the determination that the new vehicle data is spoofed.

* * * * *